United States Patent [11] 3,586,120

| [72] | Inventor | Robert Adler<br>Northfield, Ill. |
|---|---|---|
| [21] | Appl. No. | 745,264 |
| [22] | Filed | July 16, 1968<br>Division of Ser. No. 476,798, Aug. 3, 1965,<br>Pat. No. 3,419,322. |
| [45] | Patented | June 22, 1971 |
| [73] | Assignee | Zenith Radio Corporation<br>Chicago, Ill. |

[54] SOUND PROPAGATING APPARATUS
17 Claims, 5 Drawing Figs.
[52] U.S. Cl. .................................................. 181/.5,
330/5.5, 332/7.51
[51] Int. Cl. ................................................. G10k 11/00
[50] Field of Search ..................................... 181/.05;
330/5.5; 332/7.51; 350/161

[56] References Cited
UNITED STATES PATENTS

| 3,055,258 | 9/1962 | Hurvitz | 350/161 |
|---|---|---|---|
| 3,174,044 | 3/1965 | Tien | 332/7.51 |
| 3,419,322 | 12/1968 | Adler | 181/.05 |

Primary Examiner—Rodney D. Bennett, Jr.
Assistant Examiner—William T. Rifkin
Attorney—Francis W. Crotty ABSTRACT: Light-beam scanning angles obtainable from light-sound interaction are increased by introducing dispersion of the sound waves. In one general approach, the sound waves are passed through a fixed grating or otherwise through a medium which is dispersive by reason of its character. In another general approach, vibrational dispersion is obtained by launching a longitudinal wave in response to either a shear wave or an extensional wave.

INVENTOR.
Robert Adler

INVENTOR.
Robert Adler
BY
Francis W. Crotty
Attorney

SOUND PROPAGATING APPARATUS

The present application is a division of copending Pat. application Ser. No. 476,798, Now Pat. No. 3,419,322 filed Aug. 3, 1965, by Robert Adler and assigned to the assignee of the present application.

The present invention has to do with signal translating apparatus. More particularly, it pertains to apparatus in which light and sound waves interact. As utilized herein, the terms "ligh" and "sound" denote only very generally that there are two different quanta of wave energy. For example, "light" includes wave energy at wavelengths both above and below as well as within the visible light spectrum, and "sound" refers not only to audible acoustic energy but also to waves at extremely short wavelengths, including microwave frequencies.

In my copending prior application Ser. No. 388,589, now U.S. Pat. No. 3,431,504 filed Aug. 10, 1964, and assigned to the same assignee as is the present invention, sound waves are propagated across a beam of light waves. The resulting interaction causes the light beam to be diffracted. Modulation of the sound waves can subsequently be detected or demodulated either in the form of intelligence in the modulation itself or the modulation can be utilized to cause the light beam to be deflected across a light-responsive surface.

To achieve optimum operation in the system of the aforedescribed character, it is desirable that the light and sound wave fronts form a particular angle with one another; this is known as the Bragg relationship. Under the Bragg condition, when the light wave fronts intersect the sound wave front at the Bragg angle, the traveling sound wave front act upon the light energy as if they were traveling mirrors; the angles of incidence and refraction of the light waves are equal. The Bragg angle is a function of the wavelengths of the light and sound. With planar light and sound wave fronts, for a given angle there is but a limited range of tolerance over which the sound frequency may vary. In a beam scanning system, for example, this limits the extent of beam deflection available from a fixed interaction angle.

The aforesaid prior application recognizes these limitations and specifically embodies means for changing the physical relationships of the elements so as to change the angular orientation in correspondence with changes in frequency. In another of my copending applications, Ser. No. 476,873, now U.S. Pat. No. 3,373,380, filed Aug. 3, 1965 and also assigned to the same assignee, a similar overall system is disclosed in which at least one of the sound or light wave front is purposefully permitted or caused to be curved. In that way, the elements may be initially positioned so that a tangent to the curved wave front includes a tangent which intersects the light wave fronts at the Bragg angle. The many available tangents afford a wide range of sound scanning frequencies or variation in sound frequency. However, with this approach only a portion of the available sound energy is utilized for obtaining diffraction of the light.

It is accordingly a general object of the present invention to provide a light-sound interaction system which improves upon the above-described prior systems.

Another object of the present invention is to provide a light-sound interaction system in which the correct angular orientation between the light and sound waves is automatically obtained throughout a range of sound frequencies.

Both in connection with light-sound interaction for the above-described and other purposes and in a host of other systems in which sound waves are coupled to and propagated through a given medium, difficulty exists in obtaining optimum coupling and efficiency of propagation. To the extent to which such optimum relationships do not exist, the entire system efficiency is lower than may be desired.

For example, in coupling a transducer, such as a piezoelectric device, to a medium of considerably lower acoustic impedance, such as water, it usually is difficult to obtain both a good efficiency of power transfer and a wide bandwidth. One approach has been to use a quarter-wave transformer; however, if only one such transformer is employed the bandwidth is severely limited. This particular limitation can be overcome by using two or more quarter-wave transformers in cascade. If two transformers are employed, they have impedances of $Z_w n^{1/4}$ and $Z_w n^{3/4}$, respectively, where $Z_w n$ and $Z_w$ are the two impedances between which the transformation is to be made. In practice, between a piezoelectric element and water, the impedance ratio $n$ has a value between 10 and 20. Thus, the value of $n^{1/2}$ (for a single quarter wave-section) is between three and five, and $n^{1/4}$ and $n^{3/4}$ are about two and eight, respectively. The corresponding impedances of the transformers are 4.5 to 7.5 for $n^{1/2}$ and about three for $n^{1/4}$ and 12 for $n^{3/4}$, all expressed in terms of $10^6$ kilogram meter$^{12}$ second$^{11}$.

It is not easy to obtain practical materials for a single quarter-wave matching section; such materials have been synthesized by filling an epoxy with metal powder. The thicknesses involved often are of the order of 0.001 inch as a result of which the fabrication of such structures is at best difficult. Materials have been found to exist for double, cascaded quarter-wave-sections. However, such arrangements also are inconvenient because of the necessity of cementing together several precise layers of materials having widely different properties. In the usual operation, all of the layers, including the transducer, are extremely thin and flimsy. For example, piezoelectric half-wave transducers operative in the range of 60 megacycles are very fragile and difficult to obtain.

Accordingly, it is a further object of the present invention to provide new and improved signal propagating apparatus in which the efficiency of coupling and of propagation of sound waves is improved.

A related object of the present invention is to improve the impedance match between a sound transducer and a sound propagating medium.

In one form of the invention, signal translating apparatus includes means for producing a beam containing waves of spatially coherent substantially monochromatic light together with means for directing across the path of the light beam sound waves of variable frequency. Disposed in the sound path are means dispersive of the sound waves. The dispersive means vary the orientation of the sound wave fronts relative to the light wave fronts so that the sound wave fronts intersect the light wave fronts substantially at the Bragg angle, corresponding to the wavelengths of the light and sound waves, throughout a range of sound wave frequencies.

In another aspect of the invention, sound propagating apparatus includes a first medium propagative of sound energy, in the form of shear waves or extensional waves, along a boundary thereof together with means for developing the sound energy. A second medium has a boundary in common with the first and is responsive to the waves in the first medium to propagate longitudinal waves.

The features of the present invention which are believed to be novel are set forth with particularity in the appended claims.

The organization and manner of operation of the invention, together with further objects and advantages thereof, may best be understood by reference to the following description taken in connection with the accompanying drawings, in the several FIGS. of which like reference numerals identify like elements and in which:

FIG. 1 is an overall schematic diagram of a light-sound interaction system;

FIGS. 2 and 3 illustrated alternatives to the elements described in the earlier figures;

Figure 1:
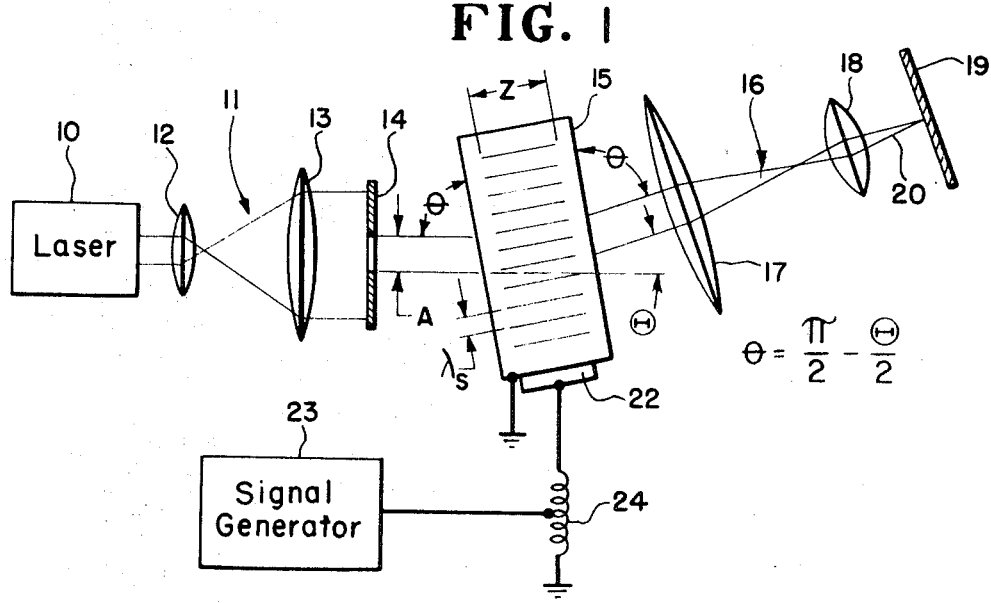

The system depicted in FIG. 1 is basically the same as that described and claimed in application Ser. No. 388,589 now U.S. Pat. No. 3,431,504 and is included here to facilitate an easier understanding of the improvements disclosed by the present application. The apparatus includes a source 10 of spatially coherent substantially monochromatic light, magnifying telescope 11 having an eyepiece 12 and an object lens 13, a beam-limiting aperture-plate 14 with an aperture width A, a light-sound interaction cell 15, an inverted-telescope 16 having an object lens 17 and an eyepiece 18, and, in this illustration, a light-responsive screen 19 across which light beam 20 is caused by the apparatus to be scanned.

In the above-mentioned patent attention is directed to dispersion of the sound waves as a result of what might broadly be termed as diffraction phenomena; the dispersion results from the physical disposition of discrete, though perhaps minute, dispersive elements. FIGS. 2 through 5 depict arrangement implementing what might be termed vibrational dispersion. This approach takes advantage of the relationships which exist between coupled waves of different types and of different sound propagation velocities in different media. By introducing additional parameters in the determination of the final sound path angle, increased flexibility is afforded in the design of the system in which the ultimate direction of the sound energy varies with frequency in accordance with a desired prescribed relationship.

Of course, the direct application in accordance with the foregoing is the attainment of a final sound wave angle which varies in accordance with the sound frequency so as to enable the maintenance of a Bragg relationship, or any other desired relationship, in a light beam deflection system. However, the use of different media in which the sound is propagated also offers distinct flexibility with respect to impedance relationships. This permits optimization of efficiencies in a variety of transducer coupling systems. For example, it is known to propagate a sound wave in a piezoelectric material which also is semiconducting or is associated with a semiconducting material in such a way that there is interaction between sound wave phenomena and electrical wave phenomena to achieve amplification of one wave by the abstraction of energy from another source. The concepts herein employed permit flexibility of selection of such parameters associated with the sound wave as direction of propagation, velocity of propagation, and the matching of impedances.

Figure 2:
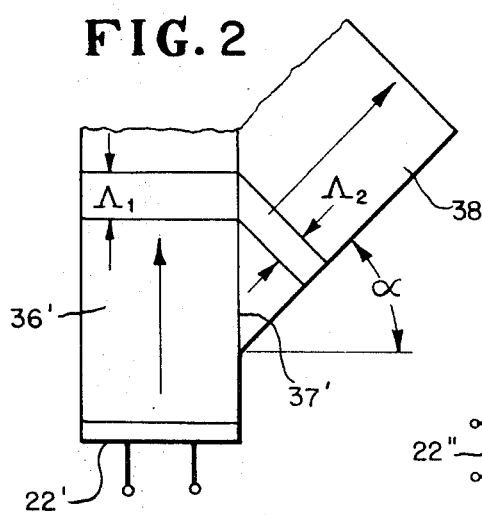

In the transducing system of FIG. 2, a slab 36' of a first, heavier medium carries along the entire length of a boundary 37' a shear wave of sound energy at a wavelength $\Lambda_1$ developed by transducer 22'. As indicated, a longitudinal wave at wavelength $\Lambda_2$ is propagated from boundary 37' in a lighter medium 38. Boundary 37' is many wavelengths long at the sound frequency. In this arrangement, advantage is taken of the surface motion which accompanies a shear wave in order to generate the longitudinal wave in medium 38. The power transmitted from medium 36' to medium 38 is extracted from the shear wave; hence, for a slab as shown bounded by parallel surfaces the shear wave is attenuated exponentially. Eventually, all of the transmitted power is transferred to medium 38 which may be water as in the case of the previously discussed light-sound interaction cells.

It will be observed that the phenomenon is analogous to the action of a traveling-wave antenna. The longitudinal wave in medium 38 is propagated under an angle $\alpha$ with respect to the direction of propagation of the shear wave in medium 36' in accordance with the relationship:

$$\sin \alpha = \frac{v_2}{v_1}, \quad (1)$$

where $v_1$ and $v_2$ are the propagation velocities respectively in media 36' and 38; $v_1$ is greater than $v_2$.

The exponential behavior mentioned above requires that the energy within the shear wave remains uniformly distributed. A certain fraction is transmitted to medium 38 per unit length. By reducing the cross section of medium 36' by that same fraction, as illustrated in FIG. 3 wherein the width of medium 36' tapers toward a smaller dimension as the sound energy therein propagates forwardly, the energy density remains constant.

Figure 3:
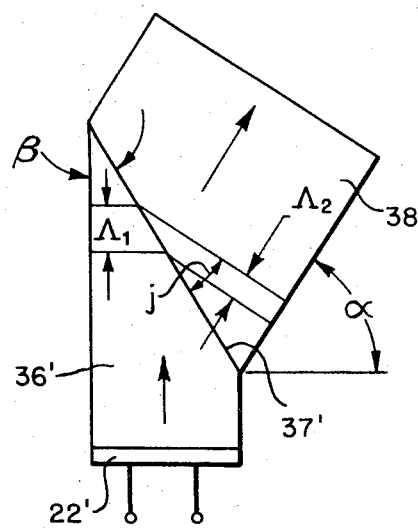

In operation of FIG. 3, a plane wave in shear is converted into a plane longitudinal wave in medium 38. The condition stated by equation (1) applies only when the wedge angle $\beta$ is zero; for FIG. 3, $$\frac{\Lambda_1}{\cos \beta} = \frac{\Lambda_2}{\sin j} \quad (2)$$

or $$\frac{\sin j}{\cos \beta} = \frac{v_2}{v_1} \quad (3)$$

where $j$ is the angle between the wave fronts in medium 38 and boundary 37'. The wedge angle $\beta$, the angle of taper of medium 36', is preferably chosen for maximum power transmission; its value depends only upon the properties of the two media. In computing the wedge angle $\beta$, consideration is directed to the requirements of equal power flow in corresponding portions of boundary 37', and that corresponding amplitudes as computed with respect to either side of the boundary must exist at the boundary.

Medium 36' is described by a modulus of rigidity G and a density $\rho_1$. The phase velocity $v_1 = \sqrt{G/\rho_1}$. The impedance $Z_1 = \sqrt{G\rho_1}$. For an excursion $x_1$ along a wave-front at the velocity is $\omega x_1$, the stress is $\omega x_1 Z_1$ and the power flow is $\omega^2 x_{1ah}^2 Z_1$, the latter two equations being in terms of a unit area.

In the medium 38, which may for example be water, the phase velocity is $v_2$ and the impedance is $Z_2$. These are determined by the density $\rho_2$ and the modulus of elasticity E. For a liquid, the modulus of elasticity is the inverse of compressibility. The equations are:

$v_2 = \sqrt{E/\rho_2}$ and
$Z_2 = \sqrt{E\rho}.$ (4)

The requirements specified above and the foregoing material parameters result in the expressions:

$x_1^2 Z_1 \sin \beta = x_2 Z_2 \cos j,$ (5) and:

$x_2 =_1 \cos (\beta + j).$ (6) For the approximate solution where $\beta \ll 1$, the propagation angle $j$ is selected to satisfy the relationship:

$$\sin j = \frac{v_2}{v_1} \quad (7)$$

and the wedge angle $\beta$ is chosen to satisfy the expression:

$$\beta = \frac{Z_2}{Z_1} \cos^3 j \quad (8)$$

In a typical example, the wedge angle $\beta$ is 0.039 radians or 2° 14 minutes. With this value, for every wavelength width (transverse to direction of sound travel) in medium 36' there are 25 wavelengths of aperture width, using water for medium 38 and a solid with a propagation velocity of 3 kilometers per second for shear waves for medium 36'. As known from standard reference works, aluminum is such a solid; this velocity for aluminum is given, for example, at pages 3—80, chapter 3F by W. P. Mason, *American Institute of Physics Hand Book*, McGraw Hill & Company, 1957. Medium 38 has an effective width of $$25\frac{v_1}{v_2} \cos j$$

which, in this example, is 41 wavelengths in the water. In terms of length dimensions, one centimeter of aperture width in the water requires 1.16 centimeters of exposed boundary surface along medium 36'; this corresponds to 0.046 centimeters width.

Figure 4:
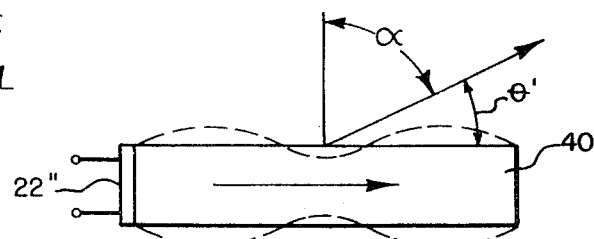
FIG. 4 represents another alternative form of such an element.
Figure 5:
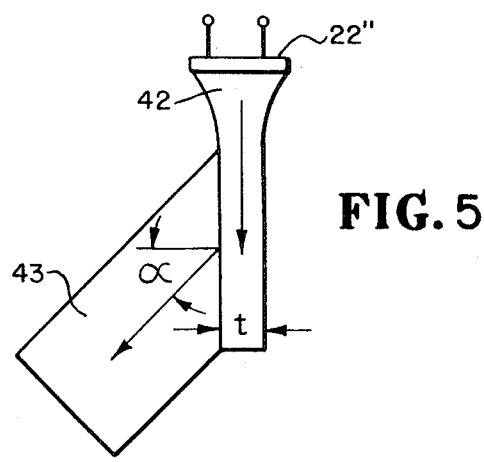
FIG. 5 represents a modified form of the element depicted in FIG. 4.

The embodiments of FIGS. 4 and 5 illustrate an approach utilizing the development of extensional waves in the first medium by transducer 22''. An extensional wave is basically a longitudinal wave having a component of transverse expansion and contraction. In FIG. 4, material 40 is physically coupled to transducer 22'' and has a thickness, transverse to the direction of sound propagation, which preferably is near that which would correspond to ½ wavelength of a longitudinal wave in the material, or an integral multitude thereof. In this thickness range and below, transverse motion accompanies the primary longitudinal wave developed by transducer 22''. This transverse motion radiates sound energy into the adjacent medium, which as in the above example may be water. As the sound is so coupled to the adjacent medium, the sound energy is gradually dissipated or attenuated exponentially in medium 40.

The simplest analysis of extensional wave action is for the condition where the thickness is much much less than a wavelength $\Lambda$ of the sound in the material, so as to exclude resonant effects. As in the case of shear waves, there is a particle motion $x_1$ which is related to the longitudinal excursion $x_0$ through the Poisson coefficient. For the longitudinal excursion $x_o$, the strain $s_o$ is equal to $$x_0 = \frac{2\pi}{\lambda_0} \quad (9)$$

the lateral strain $s_1 = Ps_o$, where P is the Poisson coefficient. Assuming that the center line remains without lateral motion, $x_1 = 1/2 s_1 t$, where $t$ is the lateral thickness. Consequently, $$x_1 = -x_0 \frac{\pi t P}{\Lambda} \quad (10)$$

As in the previous analysis, $$\frac{x_2}{x_1} = \sin \alpha \quad (11)$$

Angle $\alpha$ is the same as in FIG. 2.

It will be observed that this method of creating a sound beam whose ultimate direction is a function of its frequency employs a mode of dispersion that occurs in the vibration of the propagating body. The approach is applicable to the use of the transverse vibrations of a solid plate, such as medium 40 in FIG. 4, the transverse vibrations of a periodically loaded membrane, or surface waves which are the transverse vibrations of the interface between two different media. Such vibrations couple to pressure waves in the two media that contact the surface which is vibrating. The wave which is ultimately created, or radiated, from the vibrating surface has the same frequency and the same projected velocity along the direction of propagation of the surface wave. The actual velocity of the radiated ultimate wave will be characteristic of the medium so that its angle of propagation $\theta'$ with respect to the surface wave will be in accordance with the relationship [complemental to equation (1)]:

$$\theta' = \cos^{-1} v_p/v_s, \quad (12)$$

where $v_p$ is the velocity of a plane wave in the first medium and $v_s$ is the velocity of the transverse surface wave. Additionally, there are subsidiary radiation lobes corresponding to forward and backward radiated waves.

For the sound frequency ranges particularly discussed herein, and utilizing a typical material such as PZT (lead-zirconate-titanate), the required thickness of the first mediums for suitable operation is quite thin. In many applications, a material such as steel is more practical and less critical. Another alternative which affords greater flexibility in the choice of materials is illustrated in FIG. 5. In this instance, transducer 22'' is coupled to the large end of a strip of first material 42 which, in the direction away from transducer 22'' tapers exponentially inwardly so as to decrease its transverse thickness $t$ by a substantial amount. The thickness $t$ preferably is of a value close to that corresponding to ½ wavelength, or an integral multiple thereof, of the sound frequency in the material. This approach yields substantial dispersion of the extensional-wave velocity. Since the direction of the sound radiated or propagated into the adjacent medium 43 is directly related to the propagation velocity in the first medium by the relationship of equation (1) or (11), there is directly afforded a most suitable means of varying the direction of the ultimately radiated sound wave in correspondence with the variation in the frequency thereof.

It should be noted that in connection with all of the above alternative embodiments, advantageous flexibility of design often results when the initial or first medium has a narrow or small transverse dimension in both directions. That is, it advantageously may be in the form of a wire. The discussion with respect to both shear waves and extensional waves assumed plane surfaces. This restriction is by no means necessary. The wave-carrying surfaces well may be curved along one or both axes to achieve focusing with respect to a line or a point.

The description has included a number of different means for dispersing sound waves propagating in a medium. Such dispersion is highly advantageous in a system in which sound waves are projected across the path of a light beam at a critical angle in order to cause deflection of the light waves. Also, the techniques herein disclosed have utility in connection with the coupling of propagating sound waves between two different mediums and in achieving an increase in the transducing efficiency of a system.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. Sound propagating apparatus comprising:
    a strip of material constituting a first medium propagative of sound energy at a first velocity in the form of one of shear waves and extensional waves along a boundary thereof and means for developing said sound energy;
    a second medium having a boundary in common with a major surface of said strip and responsive to said one of the waves to propagate longitudinal waves at a velocity less than said first velocity, said boundary having a length corresponding to a number of wavelengths of said sound with the sound waves in said strip traveling along the entire length of the boundary.

2. Apparatus as defined in claim 1 wherein said first medium has an impedance to the sound energy higher than the impedance thereto of said second medium.

3. Apparatus as defined in claim 1 wherein the velocity of travel of said sound waves in said second medium away from said boundary is small relative to the velocity of travel of said sound waves along said boundary.

4. Apparatus as defined in claim 2 wherein said developing means is a transducer which has an impedance to said sound energy high compared to the impedance of said second medium thereto and said first medium has an impedance thereto of a value intermediate the other two impedances.

5. Apparatus as defined in claim 2 in which said sound energy is propagated in said first medium in the form of shear waves.

6. Apparatus as defined in claim 5 wherein the longitudinal wave fronts form an angle $\alpha$ to the shear-wave propagation direction approximately in accordance with $$\sin \alpha = \frac{v_2}{v_1}$$

where $v_1$ and $v_2$ are the propagation velocities of the shear and longitudinal waves, respectively.

7. Apparatus as defined in claim 5 wherein the cross section of said first medium tapers in the direction of propagation of said shear waves so as to become of decreasing width along the shear wave fronts.

8. Apparatus as defined in claim 7 in which the degree of taper is selected so that the energy in said shear waves remains uniformly distributed in said first medium.

9. Apparatus as defined in claim 7 wherein the angle B between said boundary and the normal to the longitudinal wave fronts is approximately in accordance with:

$$B = \frac{Z_2}{Z_1} \cos^3 j$$

where $Z_1$ and $Z_2$ are the impedances to the sound energy of said first and second mediums, respectively, and wherein $j$ is the angle between said boundary and the shear wave fronts with $$\sin j \cong \frac{v_2}{v_1}$$

where $v_1$ and $v_2$ are the propagation velocities of said shear and longitudinal waves, respectively.

10. Sound propagating apparatus as defined in claim 1 in which said sound energy is propagated in said first medium in the form of extensional waves.

11. Apparatus as defined in claim 10 in which the thickness of said strip in a direction perpendicular to said boundary is small compared to the length of said strip in the direction of sound travel.

12. Apparatus as defined in claim 10 wherein the thickness of said first medium is much smaller than the wavelength of a longitudinal wave of said sound energy therein.

13. Apparatus as defined in claim 10 wherein the thickness of said first medium approximates an integral number multiplied by one-half wavelength of a longitudinal wave of said sound energy therein.

14. Apparatus as defined in claim 10 wherein the angle $\alpha$ between the extensional wave propagation direction and the longitudinal wave fronts is selected in accordance with:

$$\sin \alpha = \frac{v_2}{v_1}$$

where $v_1$ and $v_2$ are the propagation velocities of said sound energy in said first and second mediums, respectively.

15. Apparatus as defined in claim 10 wherein said first medium is much smaller in its transverse dimensions than in length.

16. Apparatus as defined in claim 15 in which said first medium is a wire.

17. Apparatus as defined in claim 10 in which said developing means is a transducer coupled to said first medium and the latter tapers in thickness substantially exponentially from said transducer to said boundary.